July 23, 1968   P. V. GREGG   3,393,549
TUBE MACHINE
Filed April 29, 1965   3 Sheets-Sheet 1
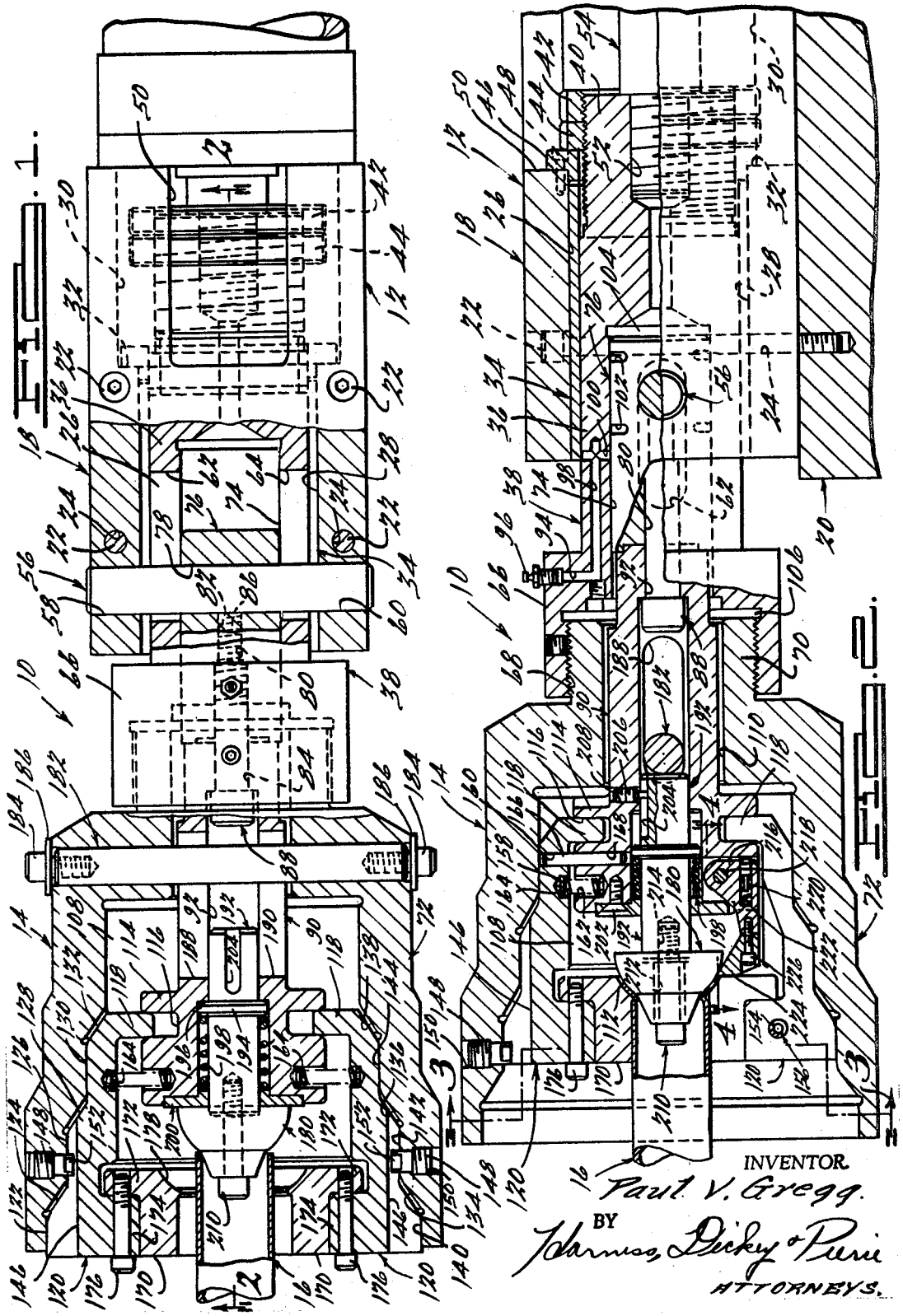
INVENTOR.
Paul V. Gregg.
BY
Harness, Dickey & Pierce
ATTORNEYS.

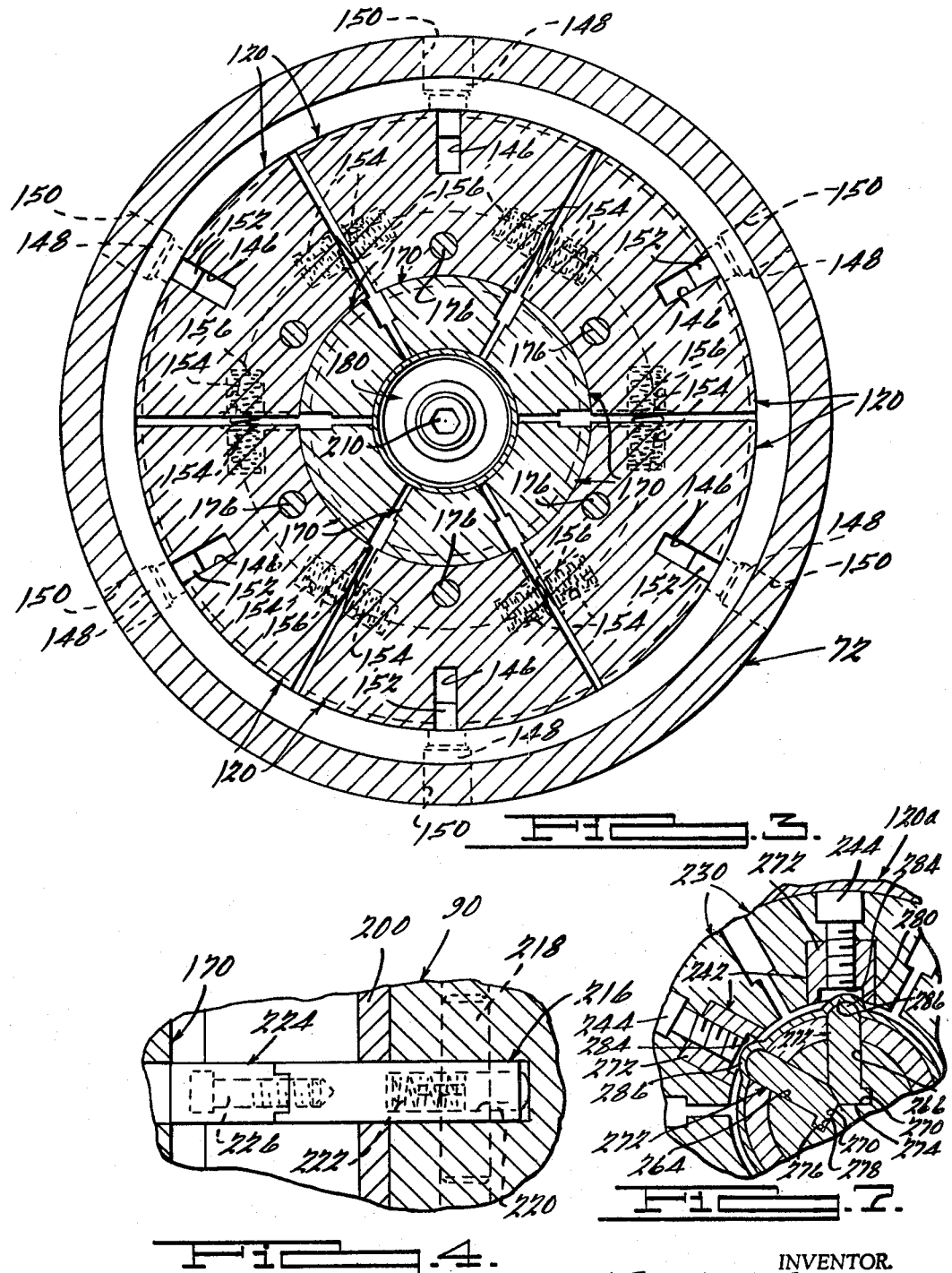

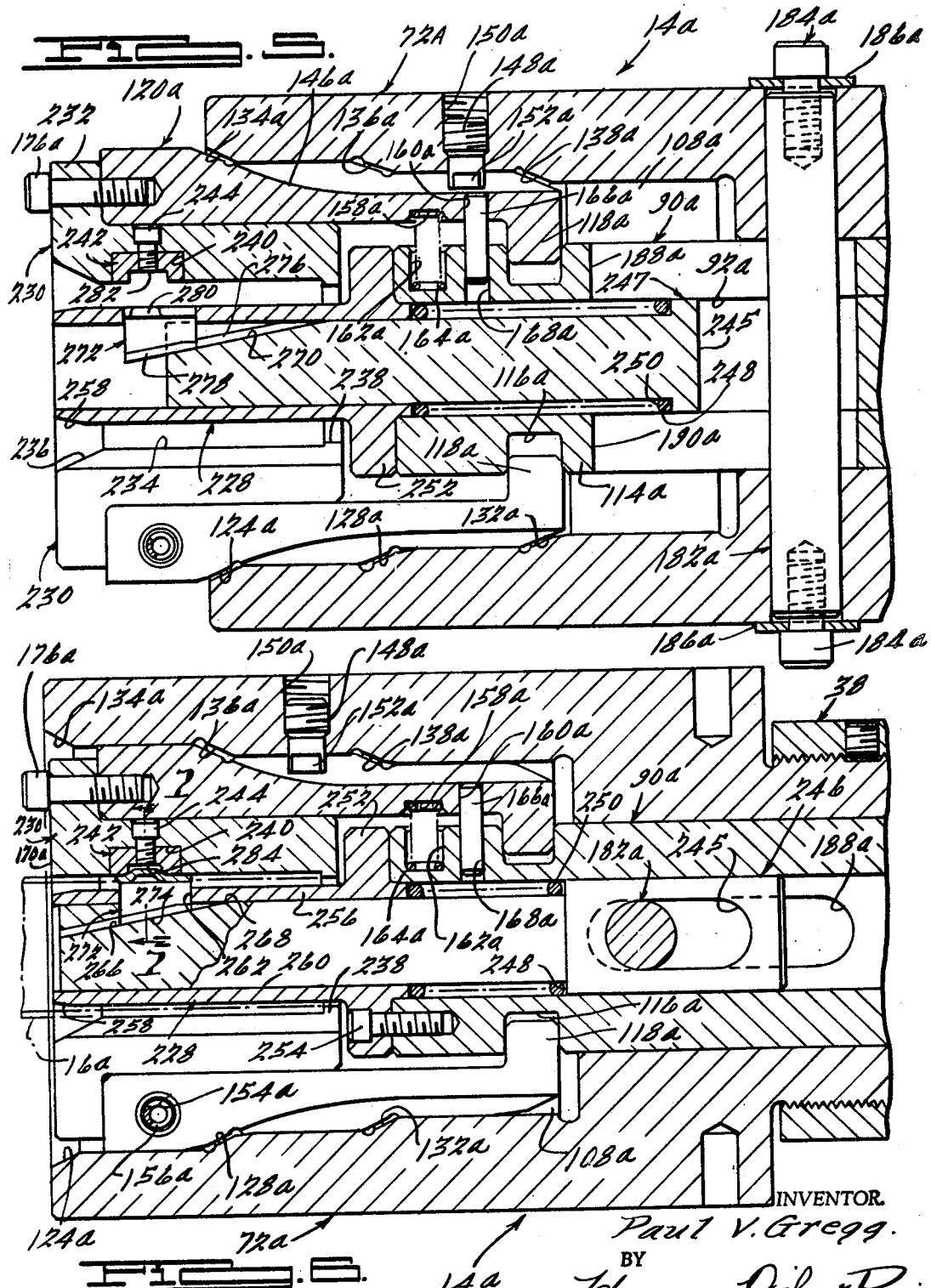

United States Patent Office 3,393,549
Patented July 23, 1968

3,393,549
TUBE MACHINE
Paul V. Gregg, Racine, Wis., assignor to Walker Manufacturing Company, Racine, Wis., a corporation of Delaware
Filed Apr. 29, 1965, Ser. No. 451,898
4 Claims. (Cl. 72—312)

ABSTRACT OF THE DISCLOSURE

A machine for deforming the end of a tube utilizes a single piston rod to move a head that cams a plurality of working holding collets into engagement with the exterior of the tube. After the tube is held by the collets, force of the piston rod is transmitted into a forming tool that is pressured into engagement with the tube to shape the end as desired. The structure is such that different forming tools can be attached to perform different operations on the end of the tube.

---

This invention relates generally to metal forming apparatus and, more particularly, to a new and improved apparatus for performing certain sizing and forming operations on thin-walled tubular members.

In the preparation of thin-walled tubular members for use in automotive tailpipes, exhaust pipes and the like, it is often necessary to subject the ends of the members to various forming operations so that tight fitting (i.e., close tolerance) joints may be provided at the juncture of the tailpipe and exhaust pipe members and their associated exhaust manifolds, mufflers and the like. More particularly, in most tailpipe and exhaust pipe installations, the end portions of the pipes or tubes are formed to a predetermined shape so as to properly engage the adjacent end portions of the associated pipes or tubular members, the engaged members thereafter being rigidly secured to one another by suitable clamping members which extend around the adjacent ends of the members and exert a compressive force upon the engaged portions thereof. One method for providing gas-tight joints between the adjacent or engaged ends of the tubular members is to flare the end of one of the members and form an outwardly projecting annular embossed portion on the other of the members, the flared and embossed portions being of a generally complementary shape so as to be substantially contiguously engaged with each other upon proper alignment of the two tubular members and thus provide for a tight joint at the juncture of the members. Another method for providing tight joints between two tubular members is to form one or more radially outwardly projecting nib portions on the end of one of the members and to form an equal number of slots or notches on the end of the other member. Upon engagement of the two members, each of the slots is adapted to receive one of the nib portions whereby to assure proper radial orientation of the members relative to one another.

It is a general object of the present invention to provide a new and improved apparatus for forming the ends of thin-walled tubular members in a manner such that tight fitting joints are provided between the ends of the members upon proper engagement and alignment thereof.

It is a more particular object of the present invention to provide a new and improved apparatus of the above character which is adapted to perform flaring and nibbing operations on the ends of automotive exhaust pipes, tailpipes and the like.

It is another object of the present invention to provide a new and improved end forming machine of the above character which includes independently operable work stock retaining means and die elements that are adapted to be selectively engaged with a particular tubular workpiece upon actuation of a single hydraulically energized power element.

It is still another object of the present invention to provide a new and improved end forming machine of the above character of an extremely simple design, which is easy to assemble, and economical to commercially provide.

Other objects and advantages of the present invention will become apparent from the following detailed description taken in conjunction with the accompanying drawings, wherein:

FIGURE 1 is a longitudinal cross-sectional view of an exemplary embodiment of the end forming apparatus of the present invention, as seen with the tubular workpiece retaining collet members in a retracted position;

FIGURE 2 is a longitudinal cross-sectional view similar to FIGURE 1, illustrating the tubular workpiece retaining collet members in a position lockingly engaged with the end of a thin-walled tubulur workpiece;

FIGURE 3 is a transverse cross-sectional view taken along the line 3—3 of FIGURE 2;

FIGURE 4 is a fragmentary cross-sectional view taken along the line 4—4 of FIGURE 2;

FIGURE 5 is a longitudinal cross-sectional view of another embodiment of the end forming apparatus of the present invention, as seen with the tubular workpiece retaining collet members in a retracted position;

FIGURE 6 is a longitudinal cross-sectional view similar to FIGURE 5, illustrating the tubular workpiece retaining collet members in a position lockingly engaged with the end of a thin-walled tubular workpiece; and FIGURE 7 is a fragmentary cross-sectional view taken along the line 7—7 of FIGURE 6.

Referring now to FIGURES 1 through 4 of the drawings, a tubular work stock end forming machine 10, constructed in accordance with the exemplary embodiment of the present invention, is shown as comprising a main body or actuating section 12 and a head assembly 14 that is operatively mounted on the left end of the body section 12 and is adapted to function in response to actuation thereof to expand or flare a portion of the end of a thin-walled tubular member, one of which is illustrated in FIGURES 1 and 2 and designated by the numeral 16, as will hereinafter be described.

Referring now in detail to the construction of the actuating section 12, as best seen in FIGURES 1 and 2, the section 12 comprises an elongated cylindrical housing, generally designated 18, which is adapted to be rigidly secured to the upper surface of a suitable support structure 20 by means of a plurality of screws, bolts or the like 22, which extend one through each of a pair of axially spaced, vertically extending bores 24 that are formed in the opposite sides of the housing 18. The housing 18 defines a longitudinally extending bore 26 which comprises a first diameter section 28 at the left end of the housing 18 and a second diameter section 30 which is slightly larger in diameter than the section 28 and is located at the right end of the housing 18, the sections 28 and 30 defining a radially extending face section 32 at the juncture thereof. A cylindrical anti-friction sleeve bushing 34 is disposed within the bore section 28 and is adapted to support an elongated cylindrical medial or support section 36 of an actuating piston member, generally designated by the numeral 38, for reciprocal movement longitudinally of the housing 18. As best seen in FIGURE 2, the right end of the piston member's support section 36 is formed with an externally threaded end portion 40 upon which a pair of adjustable stop nuts 42 and 44 are threadably mounted. The nuts 40, 42 are adapted to limit longitudinal movement of the piston member 38 toward the left end of the housing 18 as the nut 44 engages an annular stop plate 46 that is rigidly secured to the face section 32 by means of a plurality of circumferentially spaced screws, bolts or the like 448. It will be apparent, of course, that the nuts 42, 44 may be axially adjusted along the end portion 40 and thus increase or decrease the extent to which the piston member 38 may travel toward the left end of the housing 18. A rectangular-shaped access opening 50 is formed in the top of the housing 18 to facilitate adjusting the nuts 42, 44 upon the end portion 40 of the piston member 38, as best seen in FIGURE 2. The end portion 40 of the piston member 38 is also formed with an internally threaded, axially extending bore 52, which is adapted to threadably receive the left end of an externally threaded piston rod member 54 that is reciprocally mounted on a suitable power element (not shown) which is adapted to effect actuation of the end forming machine 10. In a preferred construction of the present invention, the aforesaid power element comprises a hydraulically energized piston and cylinder assembly of conventional design and which is adapted to be mounted on the support structure 20 directly to the right of the actuating section 12 of the machine 10. Suitable controls (not shown) of the type well known in the art, for example, a floor mounted, foot operated actuating switch, may be used to control selective energization of the aforesaid piston and cylinder assembly, whereby the piston rod member 54 will be biased toward the left end of the housing 18, resulting in the piston member 38 also moving toward the left to effect actuation of the machine 10, as will be described.

As best seen in FIGURE 1, a horizontally extending guide pin 56 projects transversely through the left end of the housing 18, the pin 56 being rigidly mounted within the housing 18 by having its opposite ends press fitted within a pair of axially aligned bores 58 and 60 formed in the opposite sides of the housing 18. A pair of elongated oval or oblate shaped openings 62 and 64 are formed in the opposite sides of the support section 36 of the piston member 38 through which the medial section of the pin 56 extends. The openings 62 and 64 are oriented along the piston member 38 such that the right ends of the openings 62, 64 will not engage the pin 56 as the piston rod 54 biases the piston member 38 toward the left end of the housing 18 (the stop nuts 42, 44 functioning to limit the movement of the member 38 toward the left); however, the left ends of the openings 62, 64 are adapted to engage the pin 56 as the piston member 38 moves toward the right end of the housing 18 and thereby limit such movement of the piston member 38 to a predetermined amount.

The left end of the piston member 38 is formed with an enlarged diameter cup-shaped section 66 which defines an internally threaded annular cavity 68 within which the right end of the head assembly 12 is threadably secured. More particularly, the cavity 68 is adapted to have an externally threaded right end portion 70 of a cylindrical head member, generally designated 72, threadably mounted therewithin. The left end of the piston member's support section 36 is formed with a central, axially extending bore 74 which is communicable at its left end and is coaxially aligned relative to the annular cavity 68. As best seen in FIGURE 2, an elongated cylindrical support member 76, which is slightly smaller in diameter than the bore 74, extends coaxially within the bore 74, the support member 76 being formed with a transversely extending bore 78 through which the medial portion of the guide pin 56 extends. A central bore 80 extends longitudinally through the support member 76 and comprises internally threaded right and left portions 82 and 84, respectively, the former of which intersects the bore 78 and has a locking or set screw 86 (see FIGURE 1) disposed therewithin and engaged with the pin 56 to rigidly secure the member 76 to the pin 56 and hence to the housing 18. The left or outer portion 84 of the bore 80 is adapted to threadably receive a socket head cap screw 88 which serves to rigidly secure the right end of an elongated cylindrical pull plug member, generally designated by the numeral 90, to the left end of the support member 76, the screw 88 extending coaxially through the right end of a central bore 92 that is formed in the plug member 90. It will be seen that upon energization of the aforesaid power element (not shown), the piston rod 54 and piston member 38 will move toward the left, resulting in the head member 72 also moving toward the left to effect actuation of the head assembly 14, as will later be described. It will be noted that as the members 72, 38 and 54 move toward the left, the pull plug member 90 and support member 76 will remain in a longitudinally fixed position relative to the housing 18 by virtue of the fact that the pull plug member is secured to the support member 76 which is in turn rigidly secured to the guide pin 56.

As seen in FIGURE 2, a vertically extending bore 94 is formed in the top of the section 66 of the piston member 38, which bore 94 has a conventional lubricating fitting 96 secured in the upper end thereof and intersects a horizontally extending bore 98 at its lower end. The bore 98 is communicable at its left end with the interior of the annular cavity 68 and at its right end with a vertical passage 100 which extends between the central bore 74 and the outer periphery of the piston member 38. A pair of annular recesses 102 are formed around the outer periphery of the support member 76 and serve to distribute lubricant along the annulus defined between the peripheries of the bore 74 and support member 76. An annular gasket member 104 is interposed between the right end of the support member 76 and the right end of the bore 74. Another gasket member 106 which is ring-shaped in cross section is interposed between the right end of the head member section 70 and the innermost (right) end of the cavity 68, the inner periphery of the gasket member 106 being in peripheral contact with the right end of the pull member 90 to prevent any lubricant from passing into the head assembly 14 from the body section 12.

Referring now in detail to the construction of the head assembly 14, as seen in FIGURES 1 and 2, the left end of the head member 72 is of a generally cup-shaped configuration and defines a central annular cavity 108 that is communicable at its right end with a central bore 110 that is formed in the section 70 of the head member 72 and through which the left end of the pull plug member 90 extends. Generally speaking, the left end of the pull plug member 90 is adapted to carry a plurality of circumferentially spaced collet members and a flaring arbor which are adapted to be biased into engagement with the end of the tubular workpiece 16 upon preselected movement of the head member 72 relative to the pull plug member 90, whereby the end of the tubular member 16 will have a radially outwardly extending flared portion formed thereon, as seen at 112 in FIGURE 2.

The left end of the pull plug member 90 is formed with an enlarged diameter end section 114 which has an annular recess 116 extending therearound. The recess 116 is adapted to receive and support for a radially inwardly and outwardly sliding movement, the radially inwardly projecting right end sections 118 of a plurality of equally circumferentially spaced collet members, generally designated 120, which extend longitudinally within the cavity 108 of the head member 72. The radially outermost surface of each of the collet members 120 is formed with a radially outer surface portion 122 which begins at the left ends of the members 120 and terminates at a radially inwardly tapered surface portion 124. The right end of each of the surface portions 124 terminates at a radially extending intermediate surface portion 126 which in turn terminates at a second radially inwardly tapered surface portion 128. In a similar manner, the tapered surface portion 128 of each collet member 120 terminates at its right end in an axially extending radially inner surface portion 130 which terminates at a third radially inwardly tapered surface portion 132 that is located at the right end of the collet members 120. The tapered surface portions 124, 128 and 132 correspond with a plurality of axially spaced mating tapering surface portions 134, 136 and 138 which are formed around the inner periphery of the annular cavity 108, these tapered surface portions 134, 136 and 138 being located interjacent a plurality of axially extending surface portions 140, 142 and 144 that are also formed around the inner periphery of the cavity 108 in decreasing radial distance from the center thereof, as illustrated in FIGURES 1 and 2. The collet members 120 are normally arranged within the cavity 108 such that the surface portions 122, 124, 126, 128, 130 and 132 thereof are engaged with the surface portions 140, 134, 142, 136, 144 and 138, respectively, of the head member 72. At such time as the machine 10 is actuated, the housing member 72 moves axially toward the left, while the collet members 120 remains in an axially fixed position under the influence of the axially immovable pull plug member 90, whereby the tapered surface portions 134, 136 and 138 around the interior of the cavity 108 will bias or cam the collet members 120 radially inwardly to a position where they tightly grip the end of the tubular workpiece 16, as will be described.

As best seen in FIGURE 3, each of the collet members 120 is formed with an elongated groove or recess 146 which extends longitudinally along the outer periphery thereof. A plurality of collet guide members or keys, generally designated 148, are threadably mounted within suitable apertures 150 formed around the left end of the housing member 72, each of the keys comprising a radially inwardly projecting guide section 152 which is adapted to be slidably disposed within the groove 146 of an associated collet member 120. The keys 148 are thus adapted to prevent any circumferential movement of the collet members 120 relative to the housing member 72 as the member 72 moves axially along the collet members 120. Each of the collet members 120 is formed with an annular bore or recess 154 on each side thereof, which recesses 154 are oriented such that when the collet members 120 are arranged in the operative position illustrated in FIGURE 3, each of the recesses 154 is coaxially aligned with the recess 154 formed in the adjacent side of the next adjacent collet member 120. Each of the adjacent pairs of recesses 154 is adapted to have a helical coil spring 156 disposed therewithin, the lengths of the springs 156 being such that they are maintained in a slight state of compression and thus serve to resiliently urge the adjacent radially extending sides of the collet members 120 away from each other to prevent any interference as the members 120 move radially inwardly and outwardly during operation of the machine 10.

The collet members 120 are also formed with another pair of annular recesses 158 and 160 which are located on the radially inner sides of the members 120 at a position immediately to the left of the sections 118 thereof. The annular recesses 158 are radially aligned with a plurality of circumferentially spaced recesses 162 that are formed around the left end of the pull plug member 90, each radially aligned pair of recesses 158 and 162 having a helical compression spring 164 disposed therewithin. The springs 164 function to resiliently urge the collet members 120 radially outwardly or away from the periphery of the pull plug member 90 so that the collet members 120 will automatically retract away from the end of the tubular workpiece 16 at such time as the head member 72 moves toward the right relative to the collet members 120 and pull plug 90. The annular recesses 160 are adapted to support the outer ends of a plurality of circumferentially spaced, raidally extending positioning pins, generally designated 166, the radially inner ends of the pins 166 being slidably disposed within a plurality of circumferentially spaced annular recesses 168 which are formed in the pull plug member 90 and coaxially aligned with the recesses 160 in the collet members 120.

A plurality of tubular workpiece engaging jaws, generally designated 170, are secured one to the radially inner side of each of the collet members 120. Each of the jaws 170 comprises a radially outwardly extending mounting section 172 on its right end which is secured to a radially inwardly extending end section 174 of the collets 120 by a longitudinally extending screw, bolt or the like 176. It will be seen that the radially inner surface of each of the jaws 170 is formed with an arcuate surface portion 178 which is adapted to cooperate with a substantially hemispherical shaped flaring arbor 180 which is concentrically arranged within the cavity 108 to form the flared end section 112 on the tubular workpieces 16, as will be described.

As best seen in FIGURE 1, an elongated cylindrical pressure pin or shaft 182 extends diametrically through the head member 72 adjacent the right side of the cavity 108 defined therewithin, the pin 182 being rigidly secured to the head member 72 by means of a pair of suitable screws, bolts or the like 184 which extend axially of the pin 182 and a pair of washers 186 that are retained between the screws 184 and the exterior of the head member 72. The medial portion of the pin 182 extends through a pair of diametrically opposed, elongated or oval shaped openings 188 and 190 that are formed in the opposite sides of the pull plug member 90, as best seen in FIGURE 2. As the head member 72 moves toward the left upon actuation of the machine 10, the medial section of the pin 182 is adapted to engage the right end of a cylindrical arbor member 192 which is slidably mounted within the left end of the bore 92 extending longitudinally through the pull plug member 90. The arbor member 192 is formed with a radially outwardly extending annular shoulder section 194 which is adapted to be normally urged into engagement with a radially extending face portion 196 defined within the bore 92 by means of a helical coil spring 198 which extends axially of the bore 92 and around the outer periphery of the left end of the arbor member 192. The left end of the spring 198 abuts against an annular retainer cap 200 which is rigidly secured to the left end of the pull plug member 90 by means of a plurality of circumferentially spaced screws, bolts or the like 202. The top of the right end of the arbor member 192 is formed with a longitudinally extending groove 204 within which is nested the lower end of an arbor guide member or key 206 which is threadably mounted within a vertically extending bore 208 formed in the top of the pull plug member 90, as illustrated in FIGURE 2. The flaring arbor 180 is rigidly secured to the left end of the arbor member 192 by means of an axially extending cap screw 210 that extends through a central bore 212 in the flaring arbor 180 and is threadably secured within a bore 214 in the left end of the arbor member 192.

Means for properly positioning the tubular workpiece 16 as it is inserted into the cavity 108 is provided by a positioning gauge 216 that is pivotally mounted on a horizontally extending pivot pin 218 secured to the lower side of the left end of the pull plug member 90, as best seen in FIGURES 2 and 4. The gauge 216 is formed with a horizontally extending annular recess 220 within which a helical coil spring 222 is disposed, the spring 222 engaging the pull plug member 90 at its right end and hence serving to resiliently bias the gauge 216 in a clockwise direction about the pin 218. A workpiece engaging tip section 224 is secured to the left end of the gauge 216 by means of a suitable screw, bolt or the like 226 and is adapted to engage the end of the tubular workpiece 16 as it is inserted into the cavity so as to properly orient the tube axially of the collect members 120 and flaring arbor 180.

To facilitate correlating the various elements and components hereinbefore specifically described, a brief resume of the operation of the end forming machine 10 of the present invention will now be given.

Assuming that the aforedescribed power element for actuating the machine 10 is connected to a suitable source of pneumatic or hydraulic pressure as is commonly available in factories and the like, and further assuming that one end of a thin-walled tubular workpiece such as the workpiece 16 has been inserted into the cavity 108 of the head member 72 interjacent the jaws 170 of the collet members 120, actuation of the end forming machine 10 is initiated upon energizing the aforesaid power element, for example, by tripping the hereinbefore described floor mounted, foot-actuated switch mechanism. Upon energization of the power element, the piston rod member 54 will move toward the left within the housing member 18 of the body section 12, thereby biasing the piston member 38 and the head member 72 toward the left. As the members 38 and 72 thus move, the support member 76, pull plug member 90 and a plurality of collets 120 remain axially immovable by virtue of the fact that the support member 76 is rigidly secured to the housing member 18 by means of the guide pin 56. As the head member 72 moves toward the left, the tapered surfaces 134, 136 and 138 formed around the interior of the cavity 108 serve to cam or bias the plurality of collet members 120 radially inwardly to a position where the jaws 170 secured to the radially inner sides of the collet members 120 concomitantly engage the outer periphery of the tubular workpiece 16. Further movement of the head member 72 toward the left biases the pressure pin 182 into engagement with the right end of the arbor 192, whereby the arbor 192 and flaring arbor 180 are forced toward the left and into engagement with the end of the tubular workpiece 16. It will be noted that the axial distance between the right end of the arbor 192 and the pressure pin 182 are such that the flaring arbor 180 will not be forced into engagement with the end of the workpiece 16 until it has been tightly gripped by the jaws 170 on the collet members 120, thereby preventing the flaring arbor 180 from merely biasing the tubular workpiece 16 axially toward the left as it contacts the workpiece 16. As the head member 72 moves further toward the left, the arbor 192 and flaring arbor 180 will be forced still further toward the left, whereby the hemispherical outer periphery of the flaring arbor 180 will cooperate with the surface portions 178 of the jaws 170 to deform or flare the end of the workpiece 16 to the flared configuration illustrated at 112 in FIGURE 2, thereby completing the forward or working stroke of the machine 10.

At the end of the working stroke, as above described, a suitable limit switch or the like (not shown), which may be mounted on the support structure 20 and engaged by a tripping arm or the like (not shown) on the piston member 38, may be actuated to effect deenergization of the aforedescribed power element. As the power element is thus deenergized, the piston rod 54 will move toward the right relative to the housing member 18, thereby forcing the piston member 38 and head member 72 also toward the right. As the head member 72 thus moves, the pressure pin 182 will move to the right relieving pressure on the the right end of the arbor 192 whereby the spring 198 which was compressed during the working stroke of the machine 10 will resiliently bias the arbor 192 and flaring arbor 180 secured to the left end thereof away from the end of the tubular workpiece 16. Still further movement of the piston member 38 and head member 72 toward the right will cause the surface portions 142, 136, 144 and 138 formed around the cavity 108 of the head member 72 to be biased out of engagement with the surface portions 122, 124, 126, 128, 130 and 132, respectively, whereby the compression springs 164 will resiliently bias the collet members 120 and jaws 170 secured thereto radially outwardly, resulting in the inner peripheral sections of the jaws 170 moving out of engagement from the end of the tubular workpiece 16 to permit the workpiece 16 with its flared end section 112 formed thereon to be easily removed from the machine 10. Upon complete deenergization of the aforesaid power element, all of the components of the machine 10 will be oriented in their respective positions illustrated in FIGURE 1, at which time the machine 10 may be again actuated for its next successive operational cycle, as above described.

As will hereinafter be described, the head assembly 14 of the end forming machine 10 may be replaced by other head assemblies that are substantially the same in construction and operation as the head assembly 14, but which are adapted to perform different operations on the ends of a thin-walled tubular workpiece from the flaring operation above described. One such replacement head assembly is illustrated in FIGURES 5 through 7 and is generally designated by the numeral 14a. The assembly 14a comprises a head member 72a, pull plug member 90a, pressure pin member 182a which is secured to the head member 72a by means of suitable screws 184a and retainer washers 186a, and a plurality of circumferentially spaced collet members, generally designated 120a. The members 72a, 90a, 182a, 184a, 186a and 120a are substantially identical in construction and function to their corresponding parts of the head assembly 12, with the exception that the members of the assembly 14a are operatively associated with an arbor member 228 and a plurality of sizing jaws 230 which, upon actuation of the head assembly 14a, are adapted to form a pair of outwardly projecting nib portions in the end of a thin-walled tubular workpiece such as the workpiece 16a, as will hereinafter be described.

As illustrated in FIGURES 5 and 6, the head member 72a defines a central annular cavity 108a, the interior of which defines a plurality of tapered surface portions 134a, 136a, and 138a which are adapted to function in a manner identical to the surface portions designated by like numerals in the head assembly in camming a plurality of mating tapering surface portions 124a, 128a and 132a formed on the outer periphery of each of the collet members 120a, thereby causing the members 120 to move radially inwardly. A longitudinally extending groove 146a is formed on the radially outer side of each of the collet members 120a and is adapted to slidably receive the lower guide section 152a of one of a plurality of guide keys 148a which are threaded one within each of a plurality of circumferentially spaced and radially inwardly extending bores 150a formed around the head member 72a.

The pull plug member 90a is formed within a large diameter end section 114a which defines an annular recess 116a that is adapted to receive the radially inwardly extending end sections 118a on the right ends of the collet members 120a for radially inwardly and outwardly sliding movement. As in the head assembly 14, a plurality of compression springs 164a have their opposite ends disposed within a plurality of radially aligned annular recesses 158a and 162a that are formed in the collet members 120a and pull plug member 90a, respectively, the springs 164a functioning to resiliently bias the collet members 120a radially outwardly into engagement with the inner periphery of the cavity 108a, as illustrated in FIGURE 5. A plurality of guide pins 166a are disposed within a plurality of radially aligned bores 160a and 168a that are formed in the collet members 120a and pull plug member 90a, respectively, the guide pins 166a serving to control the radially inwardly and outwardly movement of the collet members 120a during operation of the head assembly 14a, as was explained in the description of the assembly 14. Radial spacing is maintained between the adjacent sides of the plurality of collet members 120a by means of a plurality of helical coil springs 156a that extend between the adjacent sides of the collet members 120a and have their opposite ends nested within radial openings 154 that are formed one on each side of each of the collet members 120a.

Each of the collet members 120a is provided with a tubular workpiece engaging jaw member 230 that comprise radially outwardly extending end sections 232 that are secured to the outer (left) ends of the collet members 120a by means of a plurality of axially extending screws, bolts or the like 176a. Each of the jaw members 230 defines a longitudinally extending inner surface portion 234 which includes a tapered radially outwardly extending surface portion 236 at the left end and a radially inwardly extending shoulder section 238 at its right end, the shoulder portions 238 being adapted to limit the distance which the tubular workpiece 16a may be inserted into the cavity 108a, as will be described. Each of the jaw members 230 is formed with a rectangularly shaped recess 240 within each of which one of a plurality of nibbing die members 242 is secured by a suitable screw, bolt or the like 244. The dies 242 are adapted to cooperate with a nibbing punch which will later be described to form outwardly extending nib sections on the end of the tubular workpiece 16a.

The pull plug member 90a is formed with a longitudinally extending central bore 92a and with a pair of diametrically opposed elongated openings 188a and 190a. The medial portion of the pressure pin member 182a extends through the openings 188a and 190a and also extends through an elongated opening 245 which extends transversely through the right end of an elongated cylindrical nibbing puch holder 246 which is longitudinally slidable within the left end of the bore 92a. The holder 246 is formed with a radially outwardly extending shoulder portion 248 which is adapted to be engaged by the right end of a compression spring 250 which extends longitudinally of the bore 92a and around the outer periphery of the holder 246. The left end of the compression spring 250 abuts against the right end of the elongated cylindrical arbor member 228 which comprises a radially outwardly extending flange portion 252 that is of the same diameter as the section 114a of the pull plug member 90a and is rigidly secured to the left end of the section 114a by means of a plurality of circumferentially spaced and longitudinally extending screws, bolts or the like 254, as illustrated in FIGURE 6. The arbor member 228 includes a longitudinally outwardly extending body portion 256, the outer diameter of which is equal to the inner diameter of the tubular workpiece 16a, the extreme left end of the portion 256 being slightly tapered as seen at 258 to facilitate inserting the ends of the tubular workpieces onto the arbor member 228 in preparation for the sizing and nibbing operation to be performed thereon. The arbor member 228 is formed with a central longitudinally extending bore 260 which is slightly larger in diameter than the left end of the punch holder 246 and within which the left end of the punch holder 246 is slidably or reciprocally mounted. The top of the end of the arbor member 247 is formed with a pair of circumferentially spaced openings 262 which are radially and axially aligned with the recesses 240 within which the nibbing dies 242 are mounted.

As best seen in FIGURES 6 and 7, the left end of the holder 246 is formed with a pair of radially inwardly extending recesses 264 and 266. The depths of the recesses 264 and 266 decreases at a constant rate from a maximum depth at the extreme left end of the holder member 246 to a minimum where the recesses terminate at their right ends, as seen at 268 in FIGURE 6, the recesses 264 and 266 thus defining a pair of identical tapering surfaces 270. A pair of nibbing punch members 272 are disposed one within each of the openings 262 in the left end of the arbor member 228, the lower sides of each of the punch members 272 having a tapered surface 274 which is adapted to contiguously and slidably engage the tapered surfaces 270 defined at the radially innermost portions of the recesses 264 and 266. As seen in FIGURE 7, the lower ends of the recesses 264 and 266 are formed with groove portions 276 within which retaining flange sections 278 on the lower sides of the punch members 272 are slidably engaged, the flange sections serving to retain the punch members 272 within the recesses 264 and 266 while permitting relative axial movement between the punch members 272 and the holder 246. It will be seen that as the holder member 246 moves toward the left within the bore 260 of the arbor member 228 upon actuation of the head assembly 14a, as will be later described, the punch members 272 will be biased radially outwardly or upwardly through the openings 262 in the arbor member 228. In a similar manner, as the holder member moves toward the right within the bore 260, the punch members 272 will move radially inwardly. The upper ends of the punch members 272 are formed with tubular work stock engaging portions 280 which, upon radially outward movement of the members 272, are adapted to deform portions of the tubular workpieces into complementary shaped recessed portions 284 defined by the nibbing dies 242, whereby a pair of radially outwardly extending nib portions 286 will be formed in the ends of the tubular workpieces.

Due to the fact that the head assembly 14a is adapted to operate in response to actuation of the body section 12 in substantially the same manner as the hereinbefore described head assembly 14, the description of the operation of the head assembly 14a will be given without detailed or specific reference being made to the operation of the section 12.

In operation, assuming that the various component members of the assembly 14a are arranged in a position illustrated in FIGURE 5, one end of a thin-walled tubular member such as a member 16a is initially slid axially onto the arbor member 228 until the end of the member 16a is disposed adjacent the shoulder portions 238 on the collet members 120a. At such time as the tubular workpiece 16a has been properly positioned upon the arbor member 228, the hereinbefore described power element may be energized, resulting in actuation of the body section 12 which in turn results in the head member 72a moving toward the left relative to the axially fixed pull plug member 90a which is secured to the support member 76 of the body section 12. As the head member 72a moves toward the left, the tapered surfaces 134a, 136a and 138a formed around the cavity 108a thereof force the mating tapering surfaces 124a, 238a and 132a formed on each of the collet members 120a radially inwardly, thereby biasing the jaw members 230 secured on the innermost sides of the collet members 120a into peripheral engagement with the outer periphery of the tubular workpiece 16a against the resistance of the compression springs 164a. As the head member 72a thus moves, the pressure pin 182a will slide axially within the elongated opening 245 in the right end of the holder member 246 until the pin 182a engages the left end of the opening 245, at which time the holder member 246 will be forced toward the left end of the arbor member 228. It will be noted that the axial position of the opening 245 in the holder member 246 is such that the holder member 246 will not begin to move toward the left until after the collet members 120a have been forced radially inwardly a sufficient amount to secure the tubular workpiece 16a between the jaw members 230. As the holder member 246 moves toward the left within the bore 260, the punch members 272 will be forced radially outwardly from the position illustrated in FIGURE 5 where the members 272 are recessed below the outer periphery of the arbor member 228, to the position illustrated in FIGURE 6 where the sections 280 of the punch members 272 force the portions of the tubular workpiece 16a aligned with the openings 262 upwardly into the recesses 284 defined by the dies 242, thus forming the nib portions illustrated at 286 in FIGURE 6 in the tubular workpiece 16a to complete the forward or work stroke of the machine 10.

At such time as the work stroke as above described is completed, hereinbefore mentioned controls (not shown) will effect deenergization of the power element (not shown), whereby the piston member 38 in the body section 12 will move toward the right, thereby biasing the head member 72a toward the right relative to the pull plug member 90a and arbor 228. As the head member 72a thus moves to the right, the medial section of the pressure pin 182a will move out of engagement with the left end of the elongated opening 245 in the punch holder 246, at which time the spring 250 that was compressed between the right end of the arbor member 228 and the shoulder section 248 of the holder 246 during the work stroke of the assembly 14a will resiliently urge the holder member 246 toward the right. As the holder 246 moves toward the right, the punch members 272 will be biased radially inwardly to the position illustrated in FIGURE 5 where the members 272 are recessed below the outer periphery of the arbor 228. As the head member 72a moves further toward the right, the tapered surface portions 134a, 136a and 138a formed around the interior of the cavity 108a will be biased out of engagement with the associated tapered surfaces 124a, 128a and 132a on the exterior of the collet members 120a, whereby the compression springs 164a will resiliently urge the collet members 120a radially outwardly, resulting in the jaw members 230 being disengaged from the outer periphery from the end of the tubular workpiece 16a, thereby enabling the machine operator to easily remove the tubular workpiece 16 off of the arbor 228. At such time as the head member 72a has moved to the position illustrated in FIGURE 5, the head assembly 14a will be ready to begin its next successive operational cycle, as hereinabove described.

It will be seen from the foregoing description that the present invention provides a novel apparatus for forming the ends of thin-walled tubular members of the type commonly used in automotive and similar type of exhaust systems for exhaust pipes, tailpipes and the like. More particularly, the present invention provides a novel end forming apparatus of an extremely simple design wherein two successive operational steps, i.e., retaining the tubular work stock and then forming the end thereof, are accomplished by means of a single power element. Accordingly, the component and assembly costs of the present invention will be minimized to the extreme.

Although particular reference has been made herein to use of the end forming machine of the present invention for flaring and nibbing the ends of thin-walled tubular members, it will be noted that the present invention is not intended to be limited to these specific applications since it will be apparent that the principles incorporated herein may be readily applied to end forming machines which are adapted to perform slotting, swaging, notching and various other types of operations on the ends of thin-walled tubular members, by merely making minor changes in the construction of the flaring arbors and work stock retaining collets hereinabove described. Accordingly, it is to be understood that the claims appended hereto which are not specifically limited to an end forming machine for flaring or nibbing the ends of thin-walled tubular members may be construed to encompass machines for performing virtually any type of related forming operations.

While it will be apparent that the preferred embodiments illustrated herein are well calculated to fulfill the objects stated, it will be appreciated that the present invention is susceptible to modification, variataion and change without departing from the proper scope or fair meaning of the subjoined claims.

What is claimed is:
1. An end forming machine for tubes comprising a fixed position frame, a single piston rod supported in the frame and adapted to be longitudinally reciprocated by a pressure fluid cylinder, a support bar telescopic with said piston rod secured to said frame and fixed in position thereby, a head member secured to said piston rod and movable longitudinally with it, a plurality of transversely movable tube holding collets mounted on said support bar and fixed in longitudinal position thereby, cam means on the head member and collets and operative on the longitudinal pressure working stroke of the piston rod to move the collets transversely inwardly to engage the outer surface of the tube, a forming tool for operative engagement with a tube supported by said collets, said tool being carried by said support bar and capable of movement with respect to the support bar, and transverse pressure pin and slot means connecting said head to said forming tool and operative subsequent to inward transverse movement of the collets for moving the forming tool into operative engagement with the tube.

2. A machine as set forth in claim 1 wherein said support bar includes a removable pull plug member having a longitudinal bore opening out of one end and a transverse slot intersecting said bore, said forming tool being slidably supported in said bore, a transverse pin extending through said slot and secured in said head member and engageable with an end of the forming tool to transmit longitudinal movement of the head member into longitudinal movement of the forming tool, said slot and pin forming said transverse pressure pin and slot means, said tool operatively engaging a tube upon said longitudinal movement.

3. A machine as set forth in claim 1 wherein said support bar includes a removable pull plug member having a longitudinal bore opening out of one end and a transverse slot intersecting said bore, said forming tool being slidably supported in said bore, a transverse pin extending through said slot and secured in said head member and engageable with an end of the forming tool to transmit longitudinal movement of the head member into longitudinal movement of the forming tool, said slot and pin forming said transverse pressure pin and slot means, said forming tool including first and second sections having a cam-type interconnection and said longitudinal movement acting through said interconnection to cause transverse movement of one section into operative engagement with a tube.

4. A machine as set forth in claim 1 including tube positioning means fixed in longitudinal position by said support bar for engaging and positioning a tube in said machine.

References Cited
UNITED STATES PATENTS

| 2,442,224 | 5/1948 | Vaill | 72—317 X |
| 2,438,999 | 4/1948 | Hartley et al. | 72—312 X |
| 2,464,510 | 3/1949 | Hull | 72—312 |
| 2,478,102 | 8/1949 | Hull et al. | 72—312 |
| 2,480,762 | 8/1949 | Parker | 72—312 |

CHARLES W. LANHAM, *Primary Examiner.*

E. SUTTON, *Assistant Examiner.*